United States Patent [19]

Agrawal et al.

[11] Patent Number: 5,546,301

[45] Date of Patent: Aug. 13, 1996

[54] ADVANCED EQUIPMENT CONTROL SYSTEM

[75] Inventors: Mukul Agrawal, Plymouth; James E. Orrock, Eden Prairie; Pradip K. Patiath; Lloyd A. Rachor, both of Brooklyn Park, all of Minn.

[73] Assignee: Honeywell Inc., Minneapolis, Minn.

[21] Appl. No.: 277,385

[22] Filed: Jul. 19, 1994

[51] Int. Cl.$^6$ ................................................ G06F 19/00

[52] U.S. Cl. ............... 364/140; 364/281.3; 364/282.1; 364/DIG. 1; 395/650

[58] Field of Search .................... 364/468, 474.23, 364/474.24, 148–152, 140, 200; 395/600, 650, 700

[56] References Cited

U.S. PATENT DOCUMENTS

| | | | |
|---|---|---|---|
| 5,247,447 | 9/1993 | Korncoff | 364/468 |
| 5,272,642 | 12/1993 | Suzuki | 364/474.24 |
| 5,353,229 | 10/1994 | Tanaka | 364/468 |

Primary Examiner—Paul P. Gordon
Assistant Examiner—Thomas E. Brown
Attorney, Agent, or Firm—John G. Shudy, Jr.

[57] ABSTRACT

The present invention relates to a control solution development environment coupled to a runtime environment constructed to insulate the control solution designer as well as the developed control applications from both the hardware and the operating system. This insulation frees the designer from having to deal with a tangle of control and operating system commands and considerations. The runtime environment manages the details of the process system resource and task allocation to implement the control strategies. Since the runtime environment insulates the developed control applications from changes in operating systems and hardware, applications developed to run in this environment are both reusable and portable. The runtime environment is scaleable, fault-tolerant, allows dynamic reconfiguration of the system, integration of diverse sensors and actuators and enables distributed control strategies. The runtime environment is built on C++ software language, is hostable on a variety of industry-standard computer operating systems, and readily accommodates legacy and third-party software tools.

12 Claims, 3 Drawing Sheets

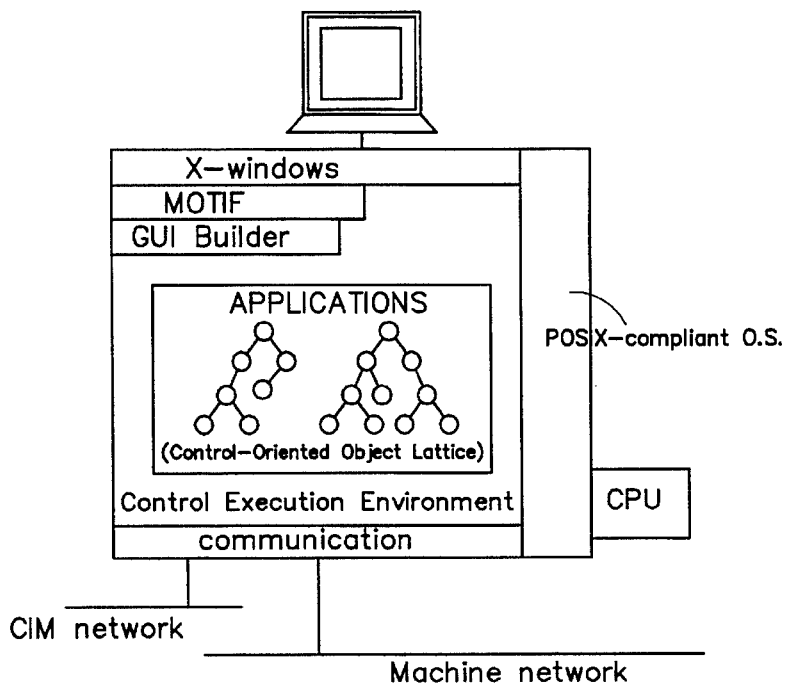

| Desired application function | Application code using the CEE |
|---|---|
| A control strategy needs to be scheduled on a periodic basis with a specified time period. | scheduler->periodic(time_period) |
| Controller needs to send a high temperature alarm to a set of alarm enunciators (e.g. printers, displays, etc.). | alarm_enunciator->dispatch_alarm (alarm_msg, target_list) |
| Controller needs to open a gas valve tagged as gas_valve23 by a specified percentage. | gas_valve23->open(percent_open) |
| Controller needs to get the temperature value from a temperature sensor tagged as temp_sensor1. | temp_sensor1->get_temperature (current_temperature) |

ADVANCED EQUIPMENT CONTROL SYSTEM

FIELD OF THE INVENTION

The present invention relates to a system for generating distributed process control solutions relatively independent of the actual computing platforms employed in the process to be controlled and capable of implementing changes to an existing process control solution dynamically. In particular, the control solutions of the present invention may obtain without the operator hand-generating a single line of software code, by utilizing tools to transform preexisting object-oriented graphical object definitions into a plurality of discrete software code accessible across the control network. Alternatively, the operator may hand-code a descriptors of a certain object that is likewise transformed for concurrent distributed access by the control network.

BACKGROUND OF THE INVENTION

In the prior art the distributed control solution to a complex process incorporating various hardware components, for example sensors and actuators, involved hand generating reams of software code specially adapted to the computing platform and the exact specification of the physical process. Even relatively simple, and similar, distributed control solutions were invariably built from the ground up, and every alteration of hardware of the process therefore required laborious, time-consuming evaluation of the impact of each such change on the control solution. Typically, weeks or even months of effort have been spent configuring a plant-wide process control system, and days or even weeks needed to make changes to the control system following a change of device components, often requiring a stoppage of the process and a reevaluation of the impact of the change on remote potions of the controlled process. Also, prior art approaches inevitably lose all their structure and interrelationships once their software code is compiled, thus requiring lengthly efforts to recreate the prior defined data structure and interrelationships.

Traditionally, control engineers delved into the details of computing that have little to do with process control theory or practical solutions to make the algorithms execute correctly. This has largely been because general purpose operating systems do not provide a useful set of high level design abstractions for the control domain. For example, the ability to easily detect specific control related events or schedule tasks appropriately for more advanced, multivariable control laws. This has resulted in monolithic control programs that have calls to the operating system buried within control loops.

SUMMARY OF THE INVENTION

The present invention relates to a process for facilitating the construction of inexpensive, reliable, real-time control system solutions capable of operating on heterogeneous computing platforms. The control system solutions of the present invention are inherently fault-tolerant while retaining the ability to be dynamically altered, that is, changed with little or no stoppage of the controlled process. The control system solutions of the present invention also provide for a reliable audit trail of activities impacting the controlled process, whether or not caused by action initiated by the operator. The present invention breaks the coupling between subsystems within the controlled process so that each operates independently.

The subcomponents of the present invention include the Control Execution Environment (CEE), the Control-Oriented Object Lattice (COOL), the Database Configuration Tool (DCT), the Control Application Development Tool (CADT), the Application Programming Interface (API), and the Application Development Interface Guidelines (ADIG). The CEE is an open architecture object-oriented software library that provides real-time operation system services custom designed for control system applications. The COOL is an object-oriented class library that supports the construction of control system applications. The COOL library contains classes for sensors, actuators, and control laws. The class hierarchy maintains a strict division between object behaviors and object configuration data.

The DCT is a tool that supports the separation of configuration (and application-) specific information from behavior-related information (the latter is contained by the methods of CEE, COOL, and application-defined objects). The DCT allows attribute information connected with the COOL-defined object hierarchy to be easily and quickly altered. All initial configuration values can be easily manipulated by the DCT. This makes hardware and software component changeout or extension as simple as making a quick interactive database entry.

The CADT is a graphical application-building environment that supports the construction of applications in a graphical mode. The CADT integrates seamlessly with the CEE and the COOL to allow application development, based solely on strategic process control considerations, in a totally graphic mode. The control solution designer need not understand software coding or be intimate with the specific hardware involved. The application code is generated automatically for the CEE. The CADT generates codes based on COOL classes that run on the CEE. The CADT is based on a widely used toolset supplied by Integrated Systems, Inc. of Santa Clara, Calif.

The CEE services and COOL classes provide a rich set of useful design abstractions for building process control solutions in software. By using CEE to perform a certain function, alarm handling or trending or sensor/actuator signal processing, without having to know about the low-level functions of the underlying operating systems. Thus resulting in a reusable and portable applications developed by the operator. The COOL class hierarchies enable flexible configuration and reuse of control application software objects. A clear separation is maintained between the control object behaviors and the object configuration data, which is managed by the DCT.

The COOL is a broad class library that is intended to be used for building software objects (i.e., sensors, actuators, controllers) needed for a control application. Most application objects can either be built directly from classes defined in the COOL library or from application-defined subclasses of the COOL classes. The COOL is specific to the application domain of each control solution created by an operator and it is a run-time object lattice whereby all the information in the COOL present before system startup is preserved, even while the system is running, thus allowing dynamic changing of the application.

Both the CEE and the COOL are available as host-independent C++ programming language software libraries that are easily ported to different hardware and software platforms.

BRIEF DESCRIPTION OF THE DRAWINGS

FIG. 3 illustrates a typical runtime environment coupled to networks in a plant.

FIG. 4 illustrates representative application codes using the CEE.

DESCRIPTION OF THE PREFERRED EMBODIMENT

A typical control application will run on more than one computer (a physical node), possibly using different kinds of computers or operation systems (heterogeneous physical nodes). Application software running on a physical node may be partitioned in to one or more process or "logical nodes." There are two key aspects of logical nodes. First, unlike typical UIX process the logical nodes are multi-threaded. This allows the application software to reflect the highly concurrent nature typical of control systems. Second, when the thread executes, the boundaries between logical nodes is transparent to the application objects; that is, an object in one logical node can invoke a method belonging to an object at a different logical node without needing to know the location of the other object. In fact, the syntax for referencing a local node, which is simply the syntax defined by C++ for method invocation, for example, status=object->Method ( . . . ). Since the location of an object is defined in the configuration database, objects can be moved between logical nodes simply by editing the configuration database to replace one object with a new object, provided the lattice already contains the new object, the application software is not affected by the change and the control sequence continues.

WRITING A LOGICAL NODE

The first step in building an applications is to decompose the system into a collection of logical nodes off-line. The rules for defining a logical node includes consideration of the architecture of the physical devices, performance/speed of communication with remote objects and local devices, and fault containment for preventing a fault in one logical node from corrupting the operation of other logical nodes.

Figure 1:
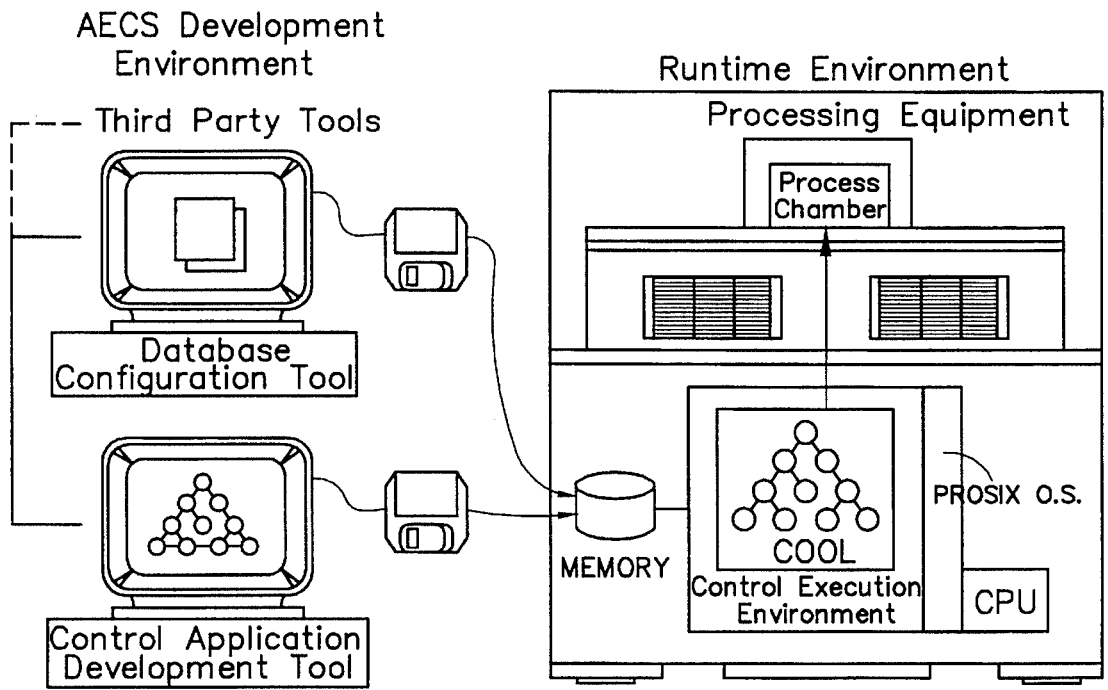
FIG. 1 illustrates the development environment coupled to the runtime environment of the instant invention.
Figure 2:
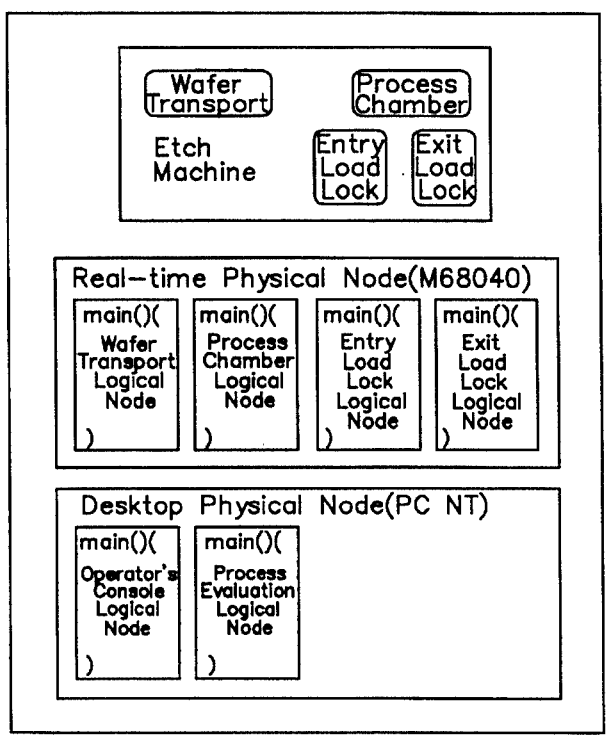
FIG. 2 illustrates a typical relationship between physical and logical nodes.
Figure 5:
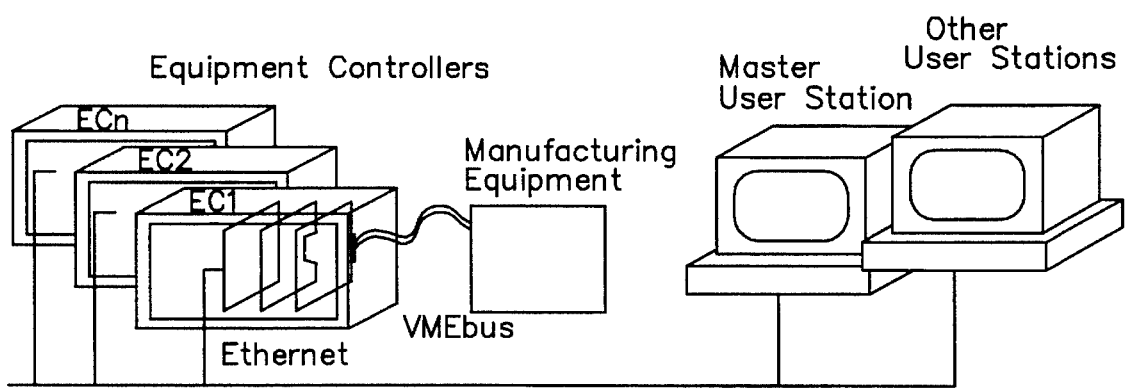
FIG. 5 illustrates a typical plant having a plurality of CPU's and controllers.

The real-world architecture of the physical devices tends to correspond to the intuitive design of application subsystems and logical nodes. For example, in the semiconductor industry, a wafer transport system might define the contents of a logical node, as illustrated in FIG. 2, shown as having four subsystems, might be partitioned into logical nodes. In FIG. 2, note how each of the subsystems is represented as a logical node. Human interaction with the system is represented by two logical nodes, for example, resident on a desktop workstation.

With respect to considerations of performance, since the CEE "hides" the location of objects from the operator, the CEE then requires more elapsed time to communicate with an object from another logical node than a local device on the same logical node. Consequently, to achieve enhanced performance, objects that interact frequently and objects that require control of real-time interaction due to process conditions should be located together locally in the same logical node.

The implementation of a logical node consists of the application objects resident in the node bound with the CEE services they require. Since the location of an object is defined by the operator in the DCT, modifying the definition of a logical node is simply a matter of changing the database via the DCT.

There are two basic mechanisms the operator can utilize to build logical nodes. The first is to use the graphical CADT and the second is to implement required high-level application classes directly in C++ and then use the source-to-source translator Object Definition Tool (ODT), which is resident in the CDT to transform ordinary C++ classes into a plurality of CEE-compliant classes. The transformation by the ODT gives the objects special capabilities, such as the ability to be referenced by objects in other logical nodes (described above). Most application objects can either be built directly from classes defined in the COOL library or from new classes previously derived from the earlier defined COOL classes.

Three top levels of COOL classes show only "class behaviors," to the operator. Configuration data is introduced to classes that exist at lower levels of the hierarchy. The first of these three top levels is the Device branch, which encompasses physical devices and systems; the ControlLaw branch, which provides domain-independent control algorithms; the Controller branch, which is used to model real-world physical controllers by using control algorithms represented by the ControlLaw branch, and the ControlTool branch which contains categories of tools that control engineer/operators need to configure and test advanced control algorithms. The appropriate primitive and advanced control algorithms developed under the ControlLaw branch can be embedded or downloaded into the Controller branch for use in a specific customized application. The tools and algorithms developed under the ControlTool branch are adaptable to be used with control applications ranging from single-variable to plant-wide. The ControlTool branch includes DevelopmentTool, UtilityTool and OperationTool children, which in turn may include subtools for the modeling, analysis, and synthesis toward tool development, data acquisition, and matrix analysis. OperationTool of course operates the previously defined and developed tools created by the ControlTool.

Also represented are the System, Sensor, and Actuator branches, which cover representations of whole plants or units within a controlled plant, and associated sensors and actuators, respectively, with the Sensor and Actuator branches covering a broad range of real-world sensor and actuator devices. Children of these branches working with values that are represented as large blocks of data (i.e., nonscalar) are termed Raw branches, for example, a spectral analysis sensor that produces intensity values for hundreds of frequencies. Staged sensors and actuators, on the other hand, use scalar integer values, and continuous sensors and actuators use scalar floating-point values.

The CEE provides the operating system services discussed below, including: startup whereby the orderly startup of a logical node occurs by first creating and initializing its own objects and then causing the creation and initialization of the application objects defined for the logical node in the configuration database; shutdown whereby the CEE provides for the orderly "shutdown" of a control application; and, "user authentication" whereby the CEE provides a scheme [user id, password] that can be used by application objects to authenticate the human users of the control applications and to restrict the operations available to certain users.

Object Naming

The CEE supports an application-wide naming scheme for application objects. Each object can have two names.

The first is a hierarchical name that denotes containment relationships among objects. This name is most useful to the application system developer. For example, the name "etchA/vacuum/pump/mainValve" suggests an object called "mainValve" that resides in the "etchA" logical node, which contains the object "vacuum," which itself contains the object "pump."

Because a hierarchical name would probably have little meaning to a human operator, aliases are an alternative and optional form of name supported by the CEE. An alias is a simple string that gives an application object a name that is meaningful to the operator and allows the CEE to reference the hierarchical name. For example, an alias for the "mainValve" object above might be "Main Valve A."

Input/Output Processing

By its nature IO tends to be device specific since each physical device has its own set of unique characteristics. CEE applications are insulated from the low-level details of getting values from hardware and are even insulated from the nuances of particular device drivers. To achieve this, the CEE provides a uniform object-oriented interface to the operator for communicating with physical devices that allows application software to do the following:

>Get sensor values from, and set actuator value through, a uniform interface that hides the peculiarities of a specific driver or its device.

>Use a variety of third-party device drivers, including drivers that are neither object-oriented nor written in C++, >Have different drivers residing on the same logical node.

>Change IO scan rate during system operation.

>Synchronize the gathering of inputs from a group of interrelated sensors to ensure that the elapsed time in reading the group is less than a prescribed maximum.

>Simulate input values that are returned in place of the actual values of the sensors; since bypassing the actual sensor is sometimes useful when testing application software.

CEE Scheduling

The CEE scheduler provides real-time scheduling services for both periodic and aperiodic activities of the controlled process. When applications register their activities with the scheduler, they also provide properties about the activity such as the importance of the activity relative to other activities underway, deadline, and periodicity. The scheduler is responsible for ensuring that all registered activities execute according to their specific properties. The scheduler also provides a mechanism for timely notification to the application software about missed deadlines.

Object Management

The CEE provides services that allow an object to be known to and accessible from all logical nodes. These services are "create," "destroy," and "find." Create and destroy are similar to C++ operators "new" and "delete" except that access to the objects created by the C++ operators is limited to the object's local logical node. Create, destroy and find accept either of the two forms of names (hierarchical and aliases) described above. Find returns a reference to the object that is then used to invoke the object's methods.

Thread Management

Threads have the unique property of being "active" which means that they execute methods on other objects. All other objects are passive; this means that they cannot run until one of their methods is called by a thread. They then execute until the method either returns or calls another method in the same or another object. When an object at a local logical node calls a method for an object at a remote logical node, the effect is as if the thread had moved to the remote logical node to run the method and returned to the local node on return of the called method. The following operations are supplied by threads: create a thread, destroy a thread, suspend execution of a thread, resume execution of a thread, cause a thread to sleep for a specified time interval, cause a thread to voluntarily give up the processor then operating to other threads on the logical node having the same priority, and allow threads to exchange data with other threads.

Thread Synchronization

The highly concurrent nature of process control applications yields applications that use many threads. The CEE provides three basic services to help the application developer ensure that the threads do not interfere with each other's operation. These basic services are: semaphore, barrier synchronization, and condition variable.

A semaphore limits concurrent access to a shared resource to a specified number of threads. Two kinds of semaphores are provided: a general counting semaphore and an optimized binary semaphore. A synchronization barrier is a software structure that causes each thread in a collection of threads to block until the entire collection is blocked, at which time the entire collection is released. A condition variable is used to block one or more threads until the condition becomes true, at which time all the threads blocked on the condition variable are released.

Process Monitoring and User Interface Refreshing:

The CEE supports an application's need to receive periodic updates for the present values of a collection of sensors. A common use of this information is to update the information presented to the human operator, often at a rate of more than once per second. The CEE provides services to allow the application to establish a reporting schedule for one or more sensors and to suspend, resume, or delete the schedule. The CEE reports the sensor values to an application-specified function that can be notified either periodically or whenever the value of a sensor changes by more than a prescribed limit. Thus creating an audit trail to verify past performance of the controlled process.

System Database

The CEE supports a system database that has four components for collecting, storing, and retrieving the following kinds of persistent information (which includes that information saved after shutdown): a periodically generated data that records information about specific events such as process change points for a given recipe or the occurrence of alarms, trending data that is recorded on a periodic basis, recipes, and system configuration.

Historization/Logging

The CEE provides services for the periodic and aperiodic collection of values of object attributes to collect, for example, process or alarm related information.

Trending

The CEE provides services for collecting process data trends, displaying trending charts, and storing and retrieving trending data with the system database.

Alarm Management

The CEE provides services for detecting alarms, taking action when an alarm is detected, displaying the alarm to human users of the system, and maintaining an alarm history in the system database.

Event Management

The CEE provides services for event identification, event detection, creating and installing event detectors, registering objects for notification of the occurrence of events, and then notifying client objects of occurrences so that remedial action may be undertaken.

Recipe Handling

The CEE provides services for specifying recipes and managing recipe execution from preexisting or newly-created recipes.

System Configuration

The CEE provides services for populating the configuration database and then creating and initializing the application objects specified for each logical node. The DCT is used to populate the database.

The CADT is a software tool for building control strategies graphically rather than by directly coding them in language like C and C++. CADT is based on tools generated and marketed by Integrated Systems, Inc., of 3260 Jay Street, Santa Clara, Calif., 95054, including their System-Build and AutoCode tools.

The entity used by CADT to represent an application is referred to as a SuperBlock. Conceptually, a SuperBlock can be viewed as a function that takes two floating-point vectors, an input vector for reading sensors and an output vector for controller actuators. SuperBlocks are built graphically using other SuperBlocks and the very large suite of built-in icons and functions. The present invention class "lsiSuperBlock" is provided to integrate a SuperBlock with the CEE. This integration is facilitated by ISI's AutoCode code generator, which transforms a SuperBlock into a C(++) function.

We claim:

1. An advanced equipment control system, comprising:

a development environment further comprising a database configuration tool and a control application development tool, said database configuration tool and said control application development tool each including a processor means for defining and then subsequently generating an inherent output composed of a plurality of inherent relationships of a plurality of remote control devices associated with a system to be controlled via an object lattice space and a configuration output composed of at least one practical configuration of functional relationships among said plurality of remote control devices wherein each processor means also includes display means;

a runtime environment including memory means for receiving the inherent output and the configuration output wherein said runtime environment further comprises a control execution environment further comprising:

a logical processor coupled to the processor means;

an operating system resident within the logical processor;

a control-oriented object lattice bearing a logical synthesis output generated by said logical processor in cooperation with the processor means of the respective outputs from the development environment and the runtime environment; and, a plurality of output signals responsive to the logical synthesis output; and wherein the remote control devices are continuously coupled to the control execution environment and operated in response to the logical synthesis.

2. The control system of claim 1, further comprising:

a plurality of active thread means for affecting a plurality of methods resident within said logical synthesis by producing at least a plurality of the following operation threads: create thread, destroy thread, suspend thread execution, resume thread execution, sleep thread, advance same-priority thread, and exchange data thread.

3. The control system of claim 2, further comprising:

a thread management means for ensuring that a first thread does not interfere with the operation of a second thread, comprising at least one of the following:

a semaphore service which limits concurrent access to a shared resource within the control system;

a barrier synchronization service which causes each thread in a collection of a plurality of threads to block, until all of said collection of threads is blocked, and at then releases the entire collection; and, a condition variable service which blocks all threads bound by a common condition until such condition become true, and then all threads blocked by said common condition are released.

4. The control system of claim 3, wherein all threads are present at a local logical node.

5. The control system of claim 1, further comprising:

at least three top levels of classes representing only a discrete class behavior for each of said remote control devices, wherein said at least three top levels of classes are resident within said development environment.

6. The control system of claim 5, further comprising:

a sensor branch; and, an actuator branch; wherein both the sensor branch and the actuator branch are resident within said development environment and each said branch contains object-oriented representations of a plurality of real-world sensor devices and actuator devices present in a plant to be controlled.

7. The control system of claim 6, further comprising:

a raw branch descending from said sensor branch and containing large blocks of data collected from each said real-world sensor devices at the plant to be controlled.

8. The control system of claim 7, wherein the object-oriented software library further comprises a start up means for first creating and initializing all objects residing within said logical synthesis before then creating and initializing each of a plurality of application objects residing in the database configuration tool.

9. The control system of claim 7, wherein the object-oriented software library further comprises a shutdown means for generating a control program shutdown sequence listing based on the logical synthesis and then running said control program shutdown sequence so that the control program stops operating without causing an alarm condition.

10. The control system of claim 7, further comprising a user authentication means operative in response to an operator sign-in input so that a preselected approved level of activity is assigned to each said operator sign-in input.

11. The control system of claim 7, further comprising an application-wide object naming means for assigning and recognizing at least two names for each object in said logical synthesis.

12. The control system of claim 11, wherein the application-wide naming means comprises at least a hierarchical name related to containment relationships among objects, and an alias selected and recognizable by an operator of the control system.

* * * * *